Aug. 26, 1969     W. A. MOORE     3,462,982

AUTOMOTIVE ANTITHEFT DEVICE

Filed June 5, 1967

William A. Moore
Inventor
by Lawrence P. Benjamin
Attorney 3,462,982
AUTOMOTIVE ANTITHEFT DEVICE
William A. Moore, 52 Hancock St.,
Lexington, Mass. 02173
Filed June 5, 1967, Ser. No. 643,442
Int. Cl. B60r 25/02; B62h 5/04
U.S. Cl. 70—209         6 Claims

ABSTRACT OF THE DISCLOSURE

An automotive antitheft device wherein a bar is placed across the diameter of a steering wheel of an automobile and locked in place to severely limit any motion of the wheel. A bracket is affixed to the bar for engaging one portion of the steering wheel while a movable bracket, which may be located in any one of a plurality of positions, engages the diametrically opposed portions of the steering wheel and is locked in place. An extension of the bar extends substantially below the lowest portion of the steering wheel and terminates adjacent the seat, preventing anyone from getting into the car, sitting behind the steering wheel and operating the controls, unless the locking device is removed.

BACKGROUND OF THE INVENTION

This invention relates to a safety device to prevent and or deter the theft of automobiles, and, in particular, to a lockable device for attachment to a steering wheel of an automobile which will prevent a potential thief from being seated in position to operate the controls of the car.

It has long been recognized that the mere locking of a car is no longer a deterrent against its being stolen and that some additional safeguards must be taken if one's property is to be protected. Various ruses have been devised in the past for discouraging the theft of a car, and one such device is the use of a hidden auxiliary ignition switch. However, switches have been known to be found and easily overcome with the result being that it merely took the thief a few minutes longer to devise a method of circumventing the safety device. It has been found that, psychologically, the prospective thief would be discouraged if he were to see the antitheft device, as he would not want to be seen in the process of removing the device and, in any event, would not have come equipped with a hacksaw or blow torch. It is, therefore, felt that a simple and inexpensive autotheft assembly which may be quickly attached to the steering wheel of a car and which antitheft device would be plainly visible for all to see, will be an adequate deterrent and in most cases prevent the car from being stolen and driven away.

There have been other devices in the past which were attached to the steering wheel of automobiles and, while they may have been satisfactory for older model automobiles, it is felt that they are no longer applicable to those cars currently in general use in the automotive field. Specifically, reference is made to two United States Patents No. 1,429,334 and No. 1,448,658, both issued to F. M. Furber. Both patents deal with antitheft devices applied to steering wheels and both patents suggest that the antitheft device be attached to the spokes of the steering wheel. This would be obviously ineffectual as a deterrent principally because of the fact that the spokes in current model American made cars emanate from the steering column at a relatively small angle for safety reasons, to form a "deep dish" configuration with the steering wheel. To attach any extension to a spoke as suggested by Furber would result in an extension piece that pointed toward the roof of the car and its purpose would be defeated. In addition, many models of cars are being manufactured with either two or three spokes emanating from the steering column, and any use of the prior art attachments would provide a wide latitude of rotation of the steering wheel allowing the car to be effectually driven away.

SUMMARY OF INVENTION

In my device, a bar of steel is provided, at about its midpoint, with a hook or C-shaped bracket which engages the lowest portion of the steering wheel. The other end of the bar is provided with a slidable, lockable hook or C-shaped bracket for engaging the diametrically opposed portion of the steering wheel and when the steering wheel is engaged by both brackets, the uppermost bracket may be locked securely in position. At the lower bracket, there is further provided an extension piece which extends to the seat, to interfere with the position the driver would ordinarily occupy when seated behind the steering wheel. Thus, if the car were entered and if the car were started, the extension piece would prevent the steering wheel from being turned to the right due to the fact that the extension piece would soon be in contact with the door thereby limiting, in one direction, rotation of the steering wheel. by the same token, an operator would be prevented from approaching the driving position should the steering wheel be turned to the left because of the presence of the extension. The driver would also be prevented from maintaining a driving position if the car were allowed only to travel straight ahead. Thus, practically speaking, my device is eminently suitable to prevent the theft of an automobile.

It is, therefore, a principal object of the present invention to provide a novel steering wheel locking device.

Another principal object of the present invention is to provide a novel steering wheel locking device that will be completely visible at all times.

Still another principal object of the present invention is to provide a novel steering wheel locking device that may be easily applied and, when not in use, may be easily stored.

The features of my invention which I believe to be novel are set forth with particularity in the appended claims. My invention itself, however, both as to its organization and method of operation, together with further objects and advantages thereof, may be best understood by reference to the following description taken in conjunction with the accompanying drawings.

DISCLOSURE OF THE PREFERRED EMBODIMENTS

Figure 1:
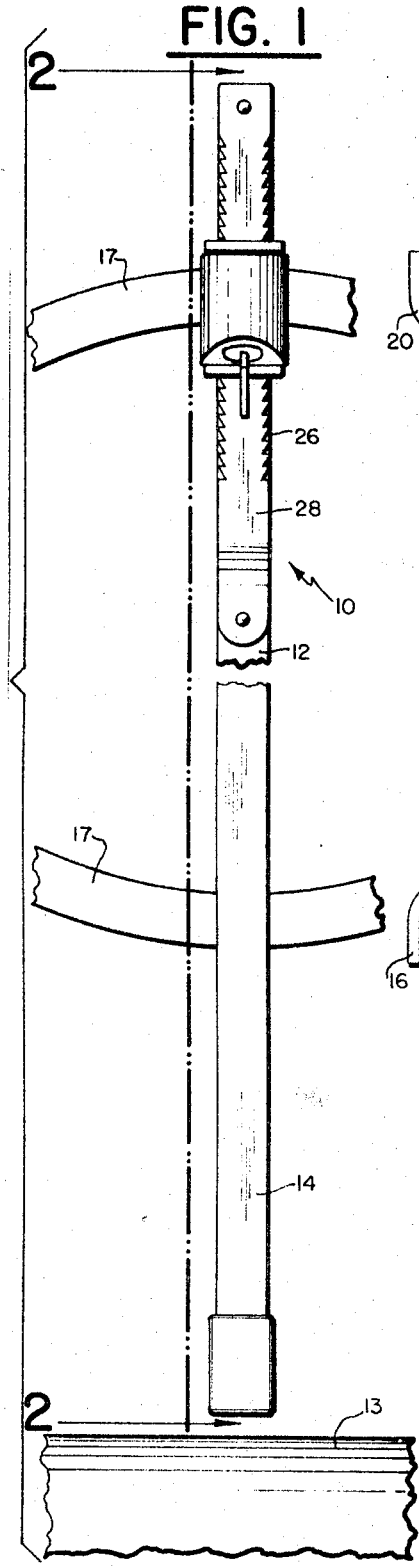
FIG. 1 is a plan view of my locking device.
Figure 2:
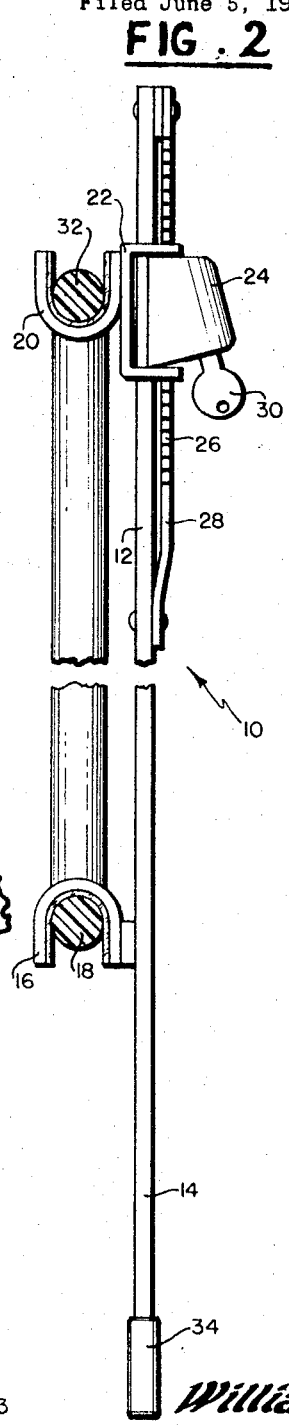
FIG. 2 is an elevational view of my locking device taken along lines 2—2 of FIG. 1.

Referring now to FIGS. 1 and 2 for one embodiment of my invention, there is shown a bar 10 of steel or other suitable material comprised of essentially two portions, 12 and 14, respectively. A C-shaped clamp 16 for engaging the lowest portion 18 of steering wheel 17, is affixed to bar 10 by means of welds or other suitable means. Clamp 20 is welded to a slideable bracket 22 which slides along portion 12 of bar 10. Locking means 24 is a particular device that has a slot therein (not shown) for engaging teeth 26 of ratchet bar 28. Teeth 26 are the "sawtooth" type which, when combined with the mating teeth (not shown) of locking means 24, allows for movement in only one direction. To lock my device to a steering wheel, clamp 16 is placed at portion 18 of the steering wheel. Thereafter, carriage 22 with lock 24 therein and bracket 20 affixed thereto is slid in an outward direction so that bracket 20 firmly engages portion 32 of the steering wheel which is diametrically opposed to portion 18. At this point, my antitheft device is firmly affixed to the steering wheel. As a matter of convenience, a rubber tip 34 may be affixed to the extension 14 to prevent the finish or upholstery of seat 13 from being marred.

To remove my antitheft device, it is only necessary to insert key 30 into its slot and rotate it ¼ turn to its unlocking position. This frees teeth 26 from engagement with mating teeth in locking means 24 allowing clamp 20 and carriage 24 to move inwardly toward the center of bar 10. Once clamp 20 can clear portion 32, the device may be lifted off and stored until the next time it is to be used.

Figure 3:
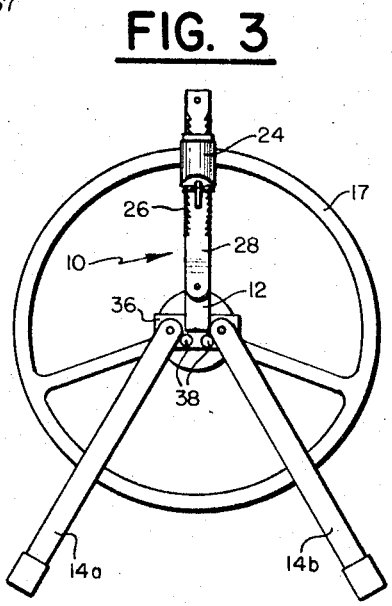
FIG. 3 is another embodiment of my novel locking device.

Referring now to FIG. 3, there is shown another embodiment of my device utilizing a tripod-type arrangement and wherein similar parts are similarly numbered. In this embodiment, extension pieces 14a and 14b are both provided with clamps or brackets similar to bracket 16 of FIG. 2. The other end of extension pieces 14a and 14b are rotatably affixed to plate 36 having stops 38 thereon so that the tripod arrangement may be easily applied to a steering wheel having two spokes. In this embodiment also, portion 12 of my locking mechanism 10 is provided with a ratchet bar 28 having teeth 26 thereon for mating with lock 24, carriage 22 and bracket 20.

To apply my device, the brackets (not shown) attached to the undersides of extension pieces 14a and 14b are made to engage the steering wheel in the same manner as described in FIGS. 1 and 2. Locking means 24 and the attached clamp (20 of FIG. 2) is slid outwardly to engage and lock against the steering wheel. Unlocking is performed in the same manner as described previously.

Figure 4:
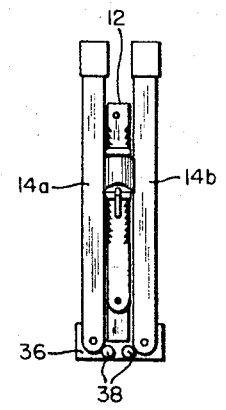
FIG. 4 is the embodiment of FIG. 3 in its folded position for storage.

As shown in FIG. 4, when not in use, extension bars 14a and 14b may be rotated parallel to portion 12 to form a compact, easily storable assembly.

While I have described what is presently considered the preferred embodiment of my invention, it will be obvious to those skilled in the art that various other changes and modifications may be made therein without departing from the inventive concept, and it is aimed to cover all such changes and modifications as fall within the true spirit and scope of my invention.

What I claim is:

1. An antomotive antitheft device for attachment to a steering wheel in an automobile, comprising:

a substantially flat bar of rigid material having first and second connected, contiguous portions arranged for attachment across the diameter of the steering wheel;

first hook means rigidly affixed to one side of the bar at the first portion for engagement with a segment of the steering wheel;

the end of the first portion of the bar extending a fixed distance from the first hook means in a direction towards the driver seat portion of the automobile, whereby the device is affixed to the steering wheel, the said end is in close proximity to the seat portion occupied by the driver;

carriage means, securable at any one of a plurality of fixed positions, in slideable engagement with the bar at the second portion thereof; and second hook means affixed to the carriage means at the one side of the bar arranged for engagement with an opposed segment of the steering wheel.

2. The device of claim 1, wherein:

the carriage means is U-shaped having a pair of slotted leg portions and a flat connecting portion disposed on the one side of the bar; and the second portion of the bar is slideably engaged in the slots in the leg portions.

3. The device of claim 2, further comprising:

locking means carried between the leg portions of the carriage means;

the locking means rigidly securing the second hook means at any one of a selected plurality of positions on the second portion of the bar.

4. The device of claim 3, further comprising:

ratchet means affixed to and spaced above the bar on the other side thereof;

the locking means in slideable engagement with the ratchet means;

the ratchet means having teeth on at least one side edge thereof to allow unrestricted movement of the locking device along the bar in a direction away from the first portion when the locking means is in a locked condition and in the opposite direction solely when the locking means is in an unlocked condition.

5. The device of claim 4, wherein;

the bar is a unitary, unbroken structure with the first and second portions arranged in and along a common axis; and the hook means are C-shaped.

6. The device of claim 4, wherein the first portion comprises:

a pair of rigid bars pivotably connected to one end of the second portion; and a pair of hook means rigidly affixed to respective ones of a pair of rigid bars on the one side thereof.

References Cited

UNITED STATES PATENTS

| 1,347,463 | 7/1920 | Jameson | 70—209 X |
|---|---|---|---|
| 1,429,334 | 9/1922 | Furber | 70—211 X |
| 1,448,658 | 3/1923 | Furber | 70—211 X |
| 1,688,496 | 10/1928 | Holtzman | 70—226 |
| 1,741,085 | 12/1929 | Valine | 224—42.29 |
| 2,531,675 | 11/1950 | Field. | |
| 2,777,527 | 1/1957 | Kleem | 180—7 |
| 3,245,239 | 4/1966 | Zaidener | 70—211 X |

MARVIN A. CHAMPION, Primary Examiner

ROBERT L. WOLFE, Assistant Examiner

U.S. Cl. X.R.

74—495; 180—114; 280—150